UNITED STATES PATENT OFFICE.

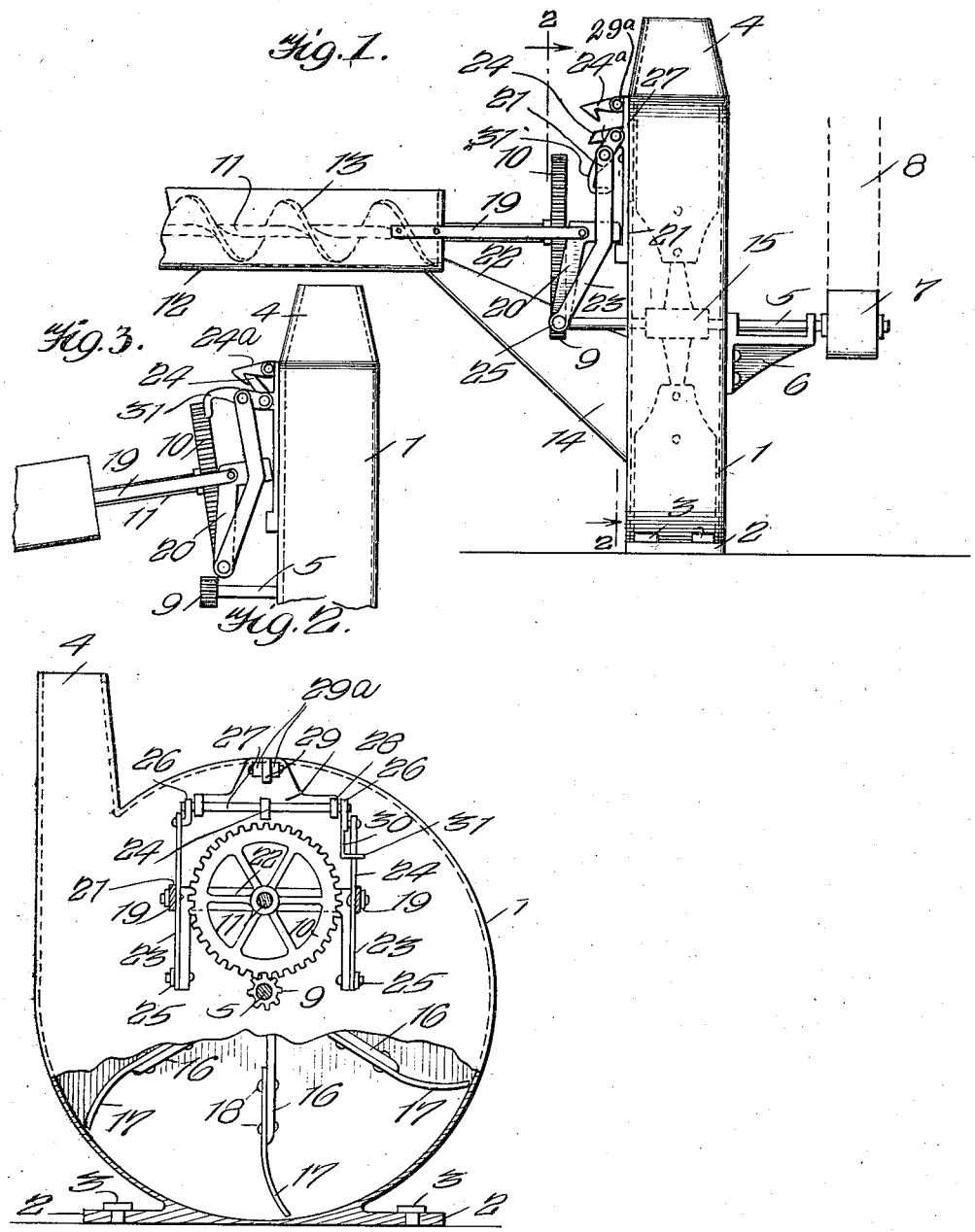

ABRAHAM L. LOEWEN, OF HILLSBORO, KANSAS.

BLOWER.

1,237,212.  Specification of Letters Patent.  Patented Aug. 14, 1917.

Application filed April 13, 1915. Serial No. 21,074.

*To all whom it may concern:*

Be it known that I, ABRAHAM L. LOEWEN, a citizen of the United States, and a resident of Hillsboro, in the county of Marion and State of Kansas, have invented a new and useful Improvement in Blowers, of which the following is a specification.

My invention is an improvement in blowers, and has for its object to provide a device of the character specified for use in cleaning grain, wherein a blower is provided, together with a feeder and a chute for connecting the feeder and the blower so connected that the feeder may be swung upward into inoperative position or downward into operative position, and wherein mechanism is provided for holding the feeder in inoperative position, the feeder being operated from the blower and the connection being such that the raising of the feeder will disconnect the operating mechanism.

In the drawings:—

Figure 1 is a side view of the improved blower,

Fig. 2 is a section on the line 2—2 of Fig. 1, looking in the direction of the arrows adjacent to the line, Fig. 3 is a view similar to Fig. 1, showing the parts in another position.

The present embodiment of the invention comprises a cylindrical casing 1, having a base 2, the said base having openings for receiving bolts 3 or the like to connect the casing to a fixed support. The casing has a tangential outlet 4, extending upwardly as shown, and a shaft 5 is journaled at the axis of the casing, the said shaft carrying the blowing mechanism, which is arranged within the casing.

In the construction shown, the fan operates the conveyer which delivers the grain to the fan. Hence the feed of the grain to the fan is directly proportioned to the speed of movement of the fan. There can be no overcrowding of the grain with this arrangement, since when the fan is running slow the grain will feed slow. When the fan is running fast the grain will feed fast.

The shaft is journaled in the ends of the casing and in a bearing bracket 6, secured to one end of the casing, the said shaft extending beyond the casing at the opposite sides thereof and having a pulley 7 secured thereto outside the bracket 6. The pulley is adapted to be connected to a suitable source of power, by means of a belt 8, or the like, and the opposite end of the shaft from the pulley is provided with a pinion 9, which meshes with a gear wheel 10 on a conveyer shaft 11, to be later described in detail.

The shaft 11 is arranged within a cylindrical casing 12 at the axis thereof, and a spiral vane 13 is secured to the shaft, the vane fitting the casing and being adapted to convey the grain from the outer end of the casing to the fan or blower casing. A feed chute 14 is arranged between the conveyer casing and the blower casing, the said chute inclining downwardly and delivering to the fan casing a little below the center thereof, as shown in Fig. 1.

The fan or blower proper, comprises a hub 15, secured to the shaft within the casing and having radial arms 16, the said arms being spaced apart from each other as shown. A blade or vane 17 is secured to each arm, the blades or vanes being curved radially of the casing, and the blades or vanes are similarly arranged, each having the convex side forwardly. The blades are of such dimensions that the side edges thereof will move close to the ends of the casing, while the free or outer ends thereof will move close to the inner surface of the periphery of the casing. Each blade or vane is reduced laterally at its inner end as shown in Fig. 1, and the reduced portion is secured to the adjacent arm by means of bolts or rivets 18.

It will be obvious that when the shaft 5 is rotated through the belt 8, the blades or vanes will move in a direction to sweep up the grain which is delivered to the casing by the chute 14, and will drive the said grain outwardly through the outlet 4. A pair of arms 19 is rigidly connected with the end of the conveyer casing adjacent to the blower casing, the said arms being on opposite sides of the casing, and the arms extend toward the blower casing at opposite sides of the gear wheel 10, and each arm is pivoted to an angle bracket 20.

Each of the angle brackets 20 consists of two portions arranged at an obtuse angle with respect to each other, one of the portions being approximately vertical and the other being of lesser length and approximately horizontal. The lower end of the approximately vertical portion of each bracket is pivoted to the lower end of an angle bar 23, by means of a bolt and nut 25, and the upper end of each angle bracket is pivoted to a lever 21, intermediate the ends of the said lever. Each of the levers 21 is pivoted to the end of a shaft 27, which is journaled in bearing lugs 28 on a bracket plate 29, secured to the adjacent face of the casing 1.

Each of the levers 21 has a catch 31 at its free end, and the said catch of each lever engages outside of the adjacent angle bar 23. The bodies of the levers 21 are at the inner sides of the angle bars 23, but the catch 31 of the lever engages outside of the bar. When the parts are in the normal position shown in Fig. 1 the upper portion of each angle bar 23 is parallel with the adjacent face of the casing 1, while the lower portion of each angle bar inclines outwardly and downwardly to its pivotal connection to the adjacent angle bracket 20.

The shaft 27 is provided intermediate its ends and at approximately its center with a radial lug 24, and the said lug is adapted to be engaged with a latch 24ª pivoted between a pair of bearing lugs 29ª on the upper end of the bracket plate 29, for holding the conveyer casing 12 with its inner end slightly lifted, sufficient to disengage the gear wheel 10 from the pinion 9.

When the parts are in the position of Fig. 1, and it is desired to disengage the gear wheel 10 from the pinion 9, that is, when it is desired to throw the conveyer out of gear the shaft 27 is oscillated to cause the lug 24 to engage with the latch 24ª. When the lug 24 is lifted into engagement with the latch 24ª the shaft 27 is oscillated, swinging the levers 21 outward in the position shown in Fig. 3. As these levers swing outward and upward the angle bars 23 are moved upward and since these bars carry the brackets 20 the said brackets are also moved upward slightly.

Since the arms 19 at the inner end of the conveyer casing 12 are pivoted to the brackets, the said arms will also be lifted as shown in Fig. 3ª, and the gear wheel 10 will be disengaged from the pinion 9. If desired the casing 12 may be swung into vertical position merely by swinging the outer end of the casing upward until the outer end of the said casing is slightly on the inner side of the pivotal connection between the arms 19 and the brackets 20. As the conveyer casing is swung, the gear wheel 10 is moved out of engagement with the pinion 9, and when the casing 12 is in vertical position, the wheel 10 has its plane almost horizontal.

The operation of the device is as follows:—

Grain is fed by the conveyer 11—12 from any suitable source of supply, and the grain passes from the casing 12 of the conveyer by way of the chute 14 to the fan or blower casing. As the grain is fed the blades 17 sweep it up and force it out through an outlet chute 4 of the casing.

I claim:—

1. In combination, a blower embodying a casing forming a support, a feeder, pivoted members connected with the feeder, other pivoted members attached to the support and having the feeder pivoted members connected thereto, and engaging means between the support and the members connected thereto for holding the feeder in elevated position.

2. In combination, a blower embodying a casing forming a support, a feeder, pivoted members connected with the feeder, other pivoted members pivoted to the first-mentioned pivoted members, a third set of pivoted members attached to the support and having the second set of pivoted members attached thereto, and engaging means between the third set of pivoted members and the support.

3. In combination, a blower embodying a casing forming a support, a feeder, pivoted members connected with the feeder, a second set of pivoted members attached to the first-mentioned pivoted members, a third set of pivoted members attached to the support and pivoted to the second set of pivoted members and having engaging portions to make detachable connection with the second set of pivoted members, and engaging means between the support and the third set of pivoted members.

4. In means of the character specified, and in combination with the feeder and a support, members having pivotal connection with the feeder, levers having pivotal connection with the said members, a second set of levers pivoted to the support and having pivotal connection intermediate of their ends with the first-mentioned levers, the second set of levers having projecting portions at their ends to engage the first-mentioned levers, and engaging means between the support and the second set of levers to hold the feeder in elevated position.

5. In combination, a feeder, a support, angle levers having pivotal connection with the feeder, a second set of angle levers having pivotal connection at one of their ends with the first-mentioned angle levers, a third set of levers having pivotal connection with the support, and having the second set of angle levers pivoted thereto at a point between their ends, the third set of levers having projections at their free ends to engage the second set of angle levers, and a latch mechanism between the support and the third set of levers for holding the feeder in elevated position.

ABRAHAM L. LOEWEN.